United States Patent [19]

Ozawa

[11] Patent Number: 4,640,341
[45] Date of Patent: Feb. 3, 1987

[54] RADIATOR FOR VEHICLES, HAVING IMPROVED MOUNTABILITY INTO VEHICLES

[75] Inventor: Motoo Ozawa, Iruma, Japan

[73] Assignee: Honda Giken Kogyo K.K., Tokyo, Japan

[21] Appl. No.: 601,289

[22] Filed: Apr. 17, 1984

[30] Foreign Application Priority Data

Apr. 19, 1983 [JP] Japan .................................. 58-69034
Apr. 21, 1983 [JP] Japan .................................. 58-70723

[51] Int. Cl.⁴ .......................................... F01P 11/08
[52] U.S. Cl. ...................................... 165/41; 165/51; 165/153; 123/41.33; 180/229
[58] Field of Search .................... 165/41, 51, 149, 153; 123/41.33; 180/229

[56] References Cited

U.S. PATENT DOCUMENTS

| | | | |
|---|---|---|---|
| 1,664,812 | 4/1928 | Gargiulo et al. | 165/149 |
| 1,783,928 | 12/1930 | Schjolin | 165/149 |
| 1,853,331 | 4/1932 | Bates | 165/41 |
| 3,635,283 | 1/1972 | Satchwell | 165/152 X |
| 4,171,729 | 10/1979 | Shibata | 165/41 X |
| 4,296,805 | 10/1981 | Fleury | 165/51 X |
| 4,428,451 | 1/1984 | Yamaoka | 165/41 X |

FOREIGN PATENT DOCUMENTS

2855285 7/1980 Fed. Rep. of Germany ...... 165/153
25866 of 1911 United Kingdom .................. 165/41

Primary Examiner—Albert W. Davis, Jr.
Assistant Examiner—Randolph A. Smith
Attorney, Agent, or Firm—Arthur L. Lessler

[57] ABSTRACT

A plurality of heat radiating passages are juxtaposed to each other. A fluid distributing chamber and a fluid collecting chamber are disposed at respective opposite ends of the radiating passages in communication therewith. The heat radiating passages each having a substantially U-shaped configuration and extending in the same directions with each other so that the fluid distributing chamber and the fluid collecting chamber are closely juxtaposed to each other.

1 Claim, 13 Drawing Figures

RADIATOR FOR VEHICLES, HAVING IMPROVED MOUNTABILITY INTO VEHICLES

BACKGROUND OF THE INVENTION

This invention relates to a radiator for vehicles, and more particularly to a radiator of this kind which has improved mountability into vehicles.

In a vehicle such as a motorcycle equipped with a water-cooled engine, a radiator for radiating the heat of hot engine cooling water is usually arranged between a frontfork supporting the front wheel and front portions of the side frame members. Such type radiator is constructed such that an inlet tank and an outlet tank are spaced from and communicated with each other by means of a plurality of juxtaposed tubes, with cooling fins interposed between adjacent ones of the tubes. Hot cooling water supplied from the engine flows into the inlet tank, and then it is cooled as it travels in the tubes, and again discharged through the outlet tank to be supplied to the engine.

As noted above, the conventional radiator has a structure wherein the inlet tank and the outlet tank are spaced from each other. As a consequence, in mounting such conventional radiator into a small space in a motorcycle or a like vehicle, it is difficult to mount connection pipes in the space for connection with the water inlet and water outlet of the radiator without interference of them with the front wheel and other peripheral parts. This forms a factor for degradation in the mountability of the radiator into the vehicle.

On the other hand, in a conventional vehicle such as a motorcycle, a radiator called "oil cooler" is provided in a circulation line of lubricating oil for lubrication of sliding parts of the engine, to cool hot lubricating oil. Such oil cooler in general has a structure wherein two plate members each formed with a groove are stuck together in face-to-face contact so that the grooves of the two plate members cooperate to form a heat radiating passage for the lubricating oil. Since the water-cooling radiator and the oil cooler are thus different in structure, they have to be fabricated on separate production lines. By this reason, conventionally two radiators with different structures but with the same function of cooling fluid are mounted into a vehicle independently of each other. This necessitates providing a vehicle with two exclusive mounting spaces for mounting the radiator and the oil cooler, and mounting the radiator and the oil cooler into these respective mounting spaces independently of each other. Paticularly in a small-sized vehicle such as a motorcycle which cannot aford providing large mounting spaces, it is difficult to mount a plurality of radiators into limited mounting spaces, resulting in an increase in the manufacturing cost of the vehicle.

SUMMARY OF THE INVENTION

It is a primary object of the invention to provide a radiator for use in a vehicle, which has a compact structure wherein the inlet tank and the outlet tank are disposed closely to each other, thereby providing improved mountability into the vehicle while permitting to make good use of a limited mounting space in the vehicle.

It is a further object of the invention to provide a radiator unit for use in a vehicle, which comprises a plurality of radiators integrally combined together in one body, and therefore requires a lesser time to mount into the vehicle, thereby reducing the manufacturing cost of the vehicle.

It is another object of the invention to provide a radiator for use in a vehicle, which permits designing the heat radiating passages large in length, thereby enhancing the degree of heat radiation.

According to the invention, a plurality of heat radiating passages are juxtposed to each other. A fluid distributing chamber is disposed at one ends of the radiating passages in communication therewith, which is supplied with cooling fluid and distributes same into the passages. A fluid collecting chamber is disposed at other ends of the passages in communication therewith, which is supplied with cooled fluid from the passages. The heat radiating passages each have a substantially U-shaped configuration and extend in the same directions with each other such that the fluid distributing chamber and the fluid collecting chamber are closely juxtaposed to each other.

The above and other objects, features and advantages of the invention will be more apparent from the ensuing detailed description taken in conjunction with the accompanying drawings.

BRIEF DESCRIPTION OF THE DRAWINGS

FIG. 7 (*a*) is a front view, partly broken away, of a half of a radiator-forming element forming part of a water-cooling radiator in FIG. 6;

FIG. 7 (*b*) is a sectional view taken along line B—B in FIG. 7 (*a*);

FIG. 7 (*c*) is a sectional side view, partly broken away, of a pair of halves identical with the half of FIG. 7 (*a*) joined together in an abutting manner;

FIG. 7 (*d*) is a sectional view taken along line D—D in FIG. 7 (*c*);

FIG. 8 (*a*) is a sectional view, partly broken away, of a half of a radiator-forming element forming part of an oil cooler in FIG. 6;

FIG. 8 (*b*) is a view similar to FIG. 7 (*c*), of a pair of halves identical with the half of FIG. 8 (*a*) joined together in an abutting manner; and FIG. 8 (*c*) is a sectional view taken along line C—C in FIG. 8 (*b*).

DETAILED DESCRIPTION

Figure 1:
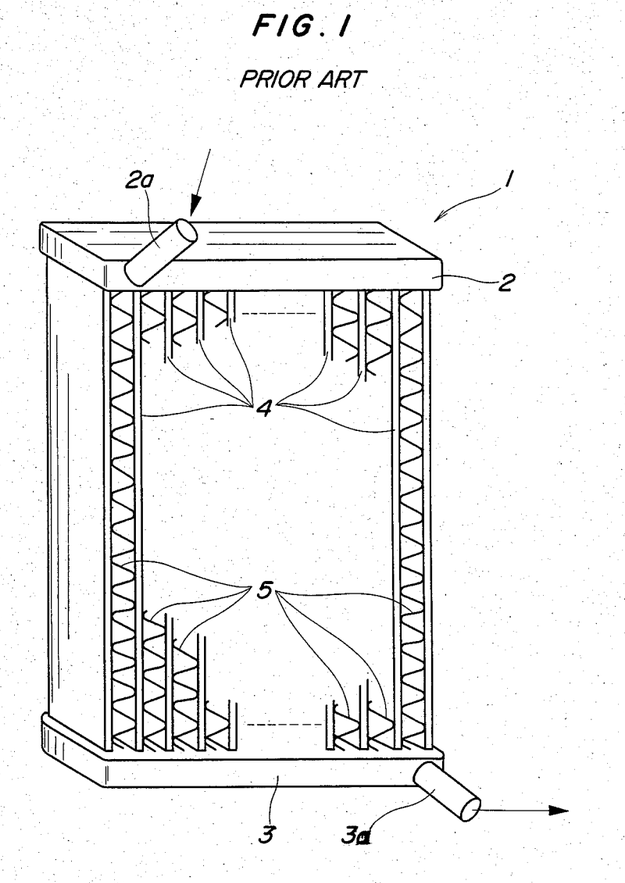
FIG. 1 is a perspective view of a conventional radiator for vehicles.

Referring first to FIG. 1, there is illustrated a conventional radiator for use in a vehicle. The radiator 1 comprises inlet and outlet tanks 2 and 3 spaced from each other by a predetermined distance, a plurality of tubes connected in juxtaposition between the tanks 2, 3 and communicating the interiors of the tanks 2, 3, with each other, and a plurality of cooling fins 5 interposed between adjacent ones of the tubes 4 to increase the substantial heat radiating surface areas thereof. Hot cooling water from the engine, not shown, flows into the inlet tank 2 through a conduit 2a, and then travels through the tubes 4 into the outlet tank 3, while being cooled by the tubes 4. The water is discharged from the outlet tank 3 into a conduit 3a to be again supplied to the engine. In the conventional radiator, the spaced arrangement of the two tubes 2, 3 can degrade the mountability of the radiator into the vehicle, as stated before.

Figure 2:
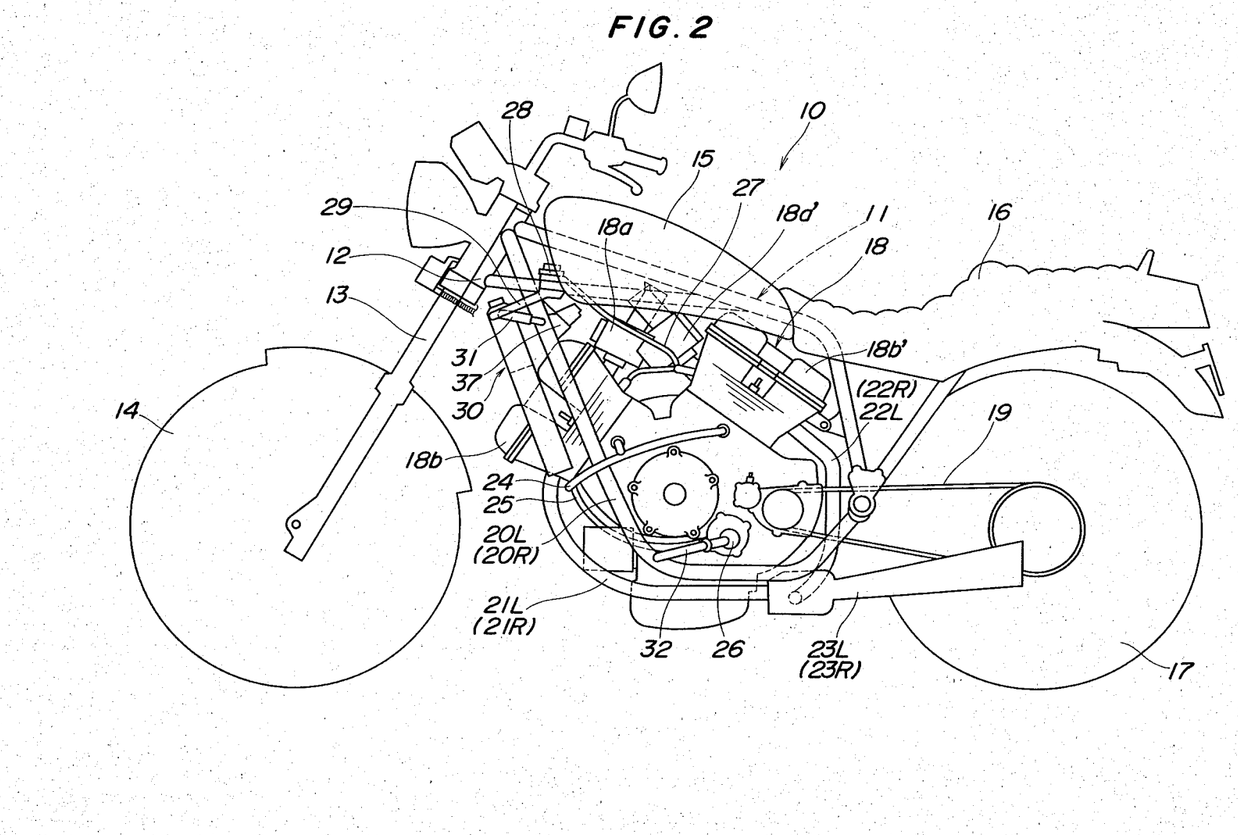
FIG. 2 is a side view of a motorcycle equipped with a radiator unit according to an embodiment of the invention.
Figure 3:
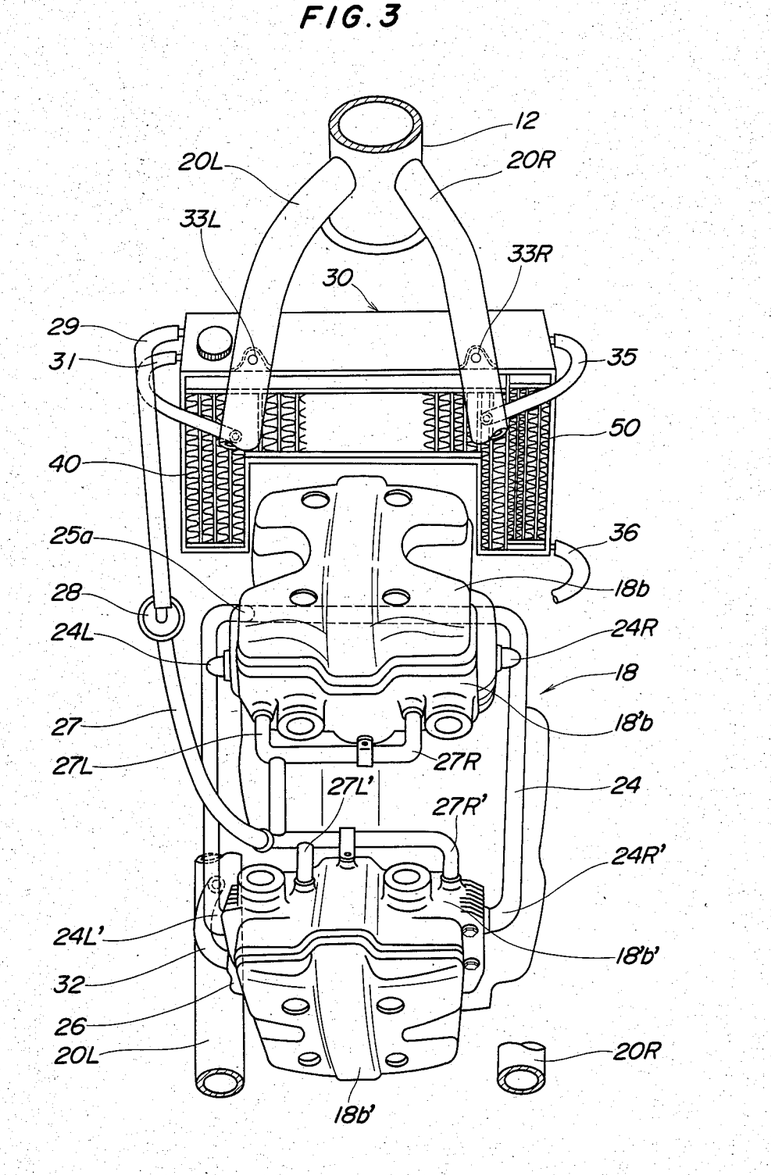
FIG. 3 is a top plan view of the radiator unit and its peripheral parts in FIG. 2.
Figure 4:
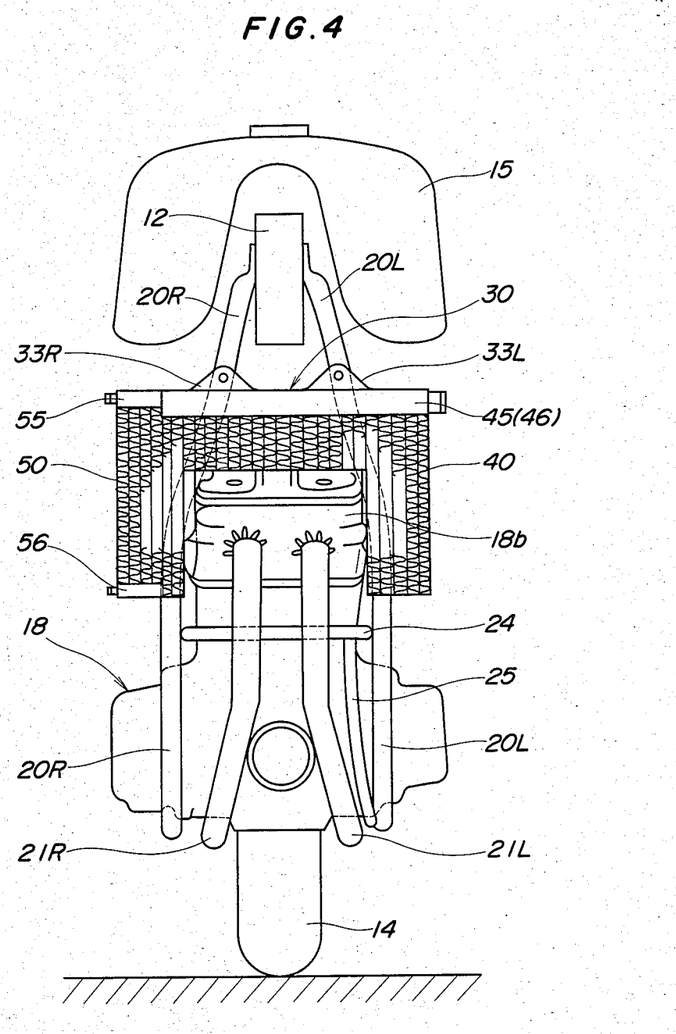
FIG. 4 is a front view of the radiator unit and its peripheral parts in FIG. 2.

One embodiment of the radiator according to the present invention will now be described in detail with reference to FIGS. 2 through 8. In FIGS. 2 through 4, a front fork 13 is coupled to a head pipe 12 of a frame body 11 of a motorcycle 10, and rotatably supports a front wheel 14. The frame body 11 supports a fuel tank 15 mounted thereon and a seat 16 also mounted thereon at a rear side of the fuel tank 15. A rear wheel 17 is rotatably supported on a rear fork, not shown, coupled to a rear portion of the frame body 11, and driven by an engine 18 by means of a chain 19.

The engine 18 is a water-cooled four cylinder V-engine in the illustrated embodiment and is fixedly mounted in the motorcycle 10 at a central location thereof, i.e. mounted on a central portion of the frame body 11. Carburetors 18a and 18a' are mounted, repectively, on two cylinder heads 18b and 18b', one of which is projected toward the front wheel 14 through left and right side frame members 20L, 20R. Further, the engine 18 has exhaust pipes 21L-22R connected, respectively, to the cylinders of the engine. Exhaust pipes 21L, 21R extending from the cylinder head 18b are joined, respectively, with ones of exhaust pipes 22L, 22R extending from the cylinder head 18b', at mufflers 23L, 23R on opposite lateral sides of the motorcycle 10.

Water jackets 18'b and 18'b' are formed integrally on respective ones of the cylinder heads 18b, 18b' and their corresponding cylinder blocks in a manner surrounding their respective cylinders in the cylinder blocks. A conduit 24 communicates with these water jackets 18'b, 18'b' at water inlet conduit portions 24L, 24R, and 24L', 24R', and is connected at a junction 25a with a conduit 25 which is in turn connected to the outlet of a water pump 26 driven by the engine 18.

Connected to the water jackets 18'b, 18'b' are cooling water outlet pipes 27L, 27R, 27L' and 27R' which are all joined to a conduit 27 extending outside the engine 18 and connected to the inlet of a thermostat 28. The outlet of the thermostat 28 is connected through a conduit 29 to a fluid distributing chamber or inlet tank 45 of a water-cooling radiator 40 forming part of a radiator unit 30 according to the invention. The water-cooling radiator 40 has a fluid collecting chamber or outlet tank 46 is connected to the suction port of the water pump 26 through a conduit 31, an internal passage in the left side frame member 20L, and a conduit 32. The thermostat 28 is adapted to selectively establish and interrupt the communication between the conduits 27, 29 in such a manner that the communication between the conduits 27, 29 is interrupted during warming-up operation of the engine to temporarily stop the circulation of cooling water within the cooling system to thereby promote the warming-up of the engine.

The radiator unit 30 is mounted between the front fork 13 and the left and right side frame members 20L, 20R and fixed at fitting portions 33L and 33R to upper portions of the left and right side frame members 20L, 20R. The radiator unit 30 has a portal or inverted-U shape so as to increase the heat radiating surface area as well as avoiding its interference with the cylinder head 18b projected into a space between the side frame members 20L, 20R. The radiator unit 30 has an integral oil cooler 50 formed at central and right side portions as viewed in FIGS. 3 and 4 for cooling lubricating oil circulating in the motorcycle 10. The oil cooler 50 has a fluid distributing chamber or inlet tank 55 connected to the outlet of an oil pump, not shown, through a conduit 35 and an internal passage in the right side frame member 20R communicating therewith, and a fluid collecting chamber or outlet tank 56 connected to an oil filter, not shown, through a conduit 36. Lubricating oil pumped from the oil pump is fed to the oil cooler 50, and the cooled oil discharged therefrom is delivered through the above oil filter to various sliding parts of the engine 18 and other sliding parts of the motorcycle 10.

Figure 5:
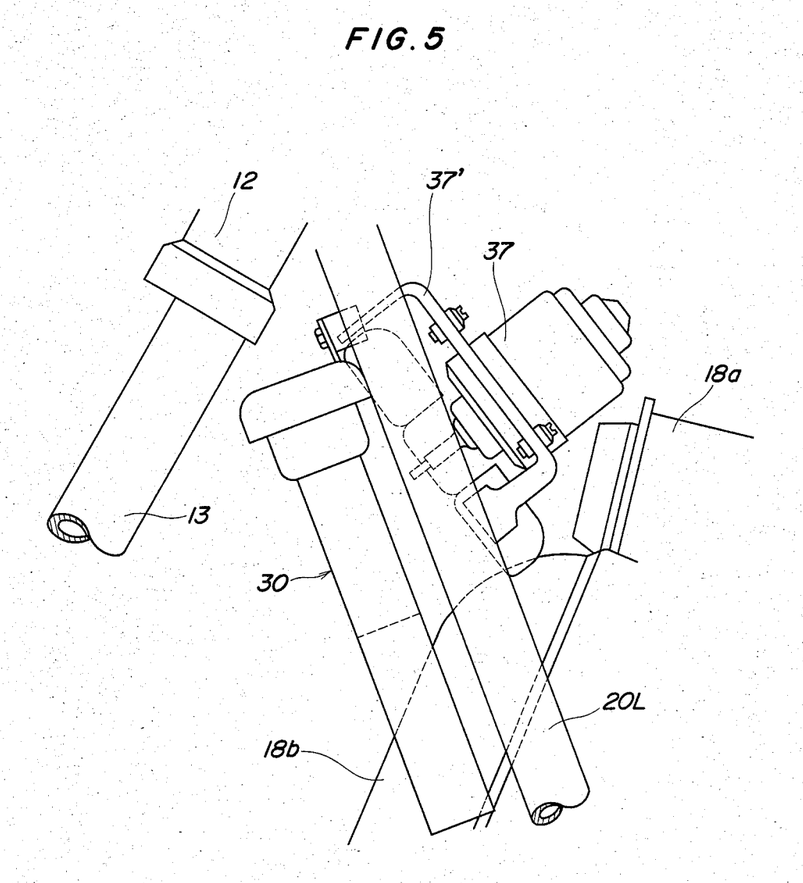
FIG. 5 is an enlarged fragmentary side view of the motorcycle of FIG. 2 showing in detail the cooling fan also appearing in FIG. 2.

As shown in FIG. 5, a cooling fan 37 is arranged between the radiator unit 30 and the carburetor 18a at a central portion of the radiator unit 30 and mounted on the side frame member 20L by means of a bracket 37'. The cooling fan 37 is adapted to operate in response to changes in the temperature of the engine in such a manner that it is inoperative when the engine temperature is low, while when the engine temperature is high, it operates to force air in front of the radiator unit 30 to pass through the unit 30 to thereby enhance the cooling efficiency of the unit 30. The cooling fan 37 is also operable when the radiator unit 30 specially requires cooling on such an occasion as during standing operation of the vehicle where cooling breeze is not available.

Figure 6:
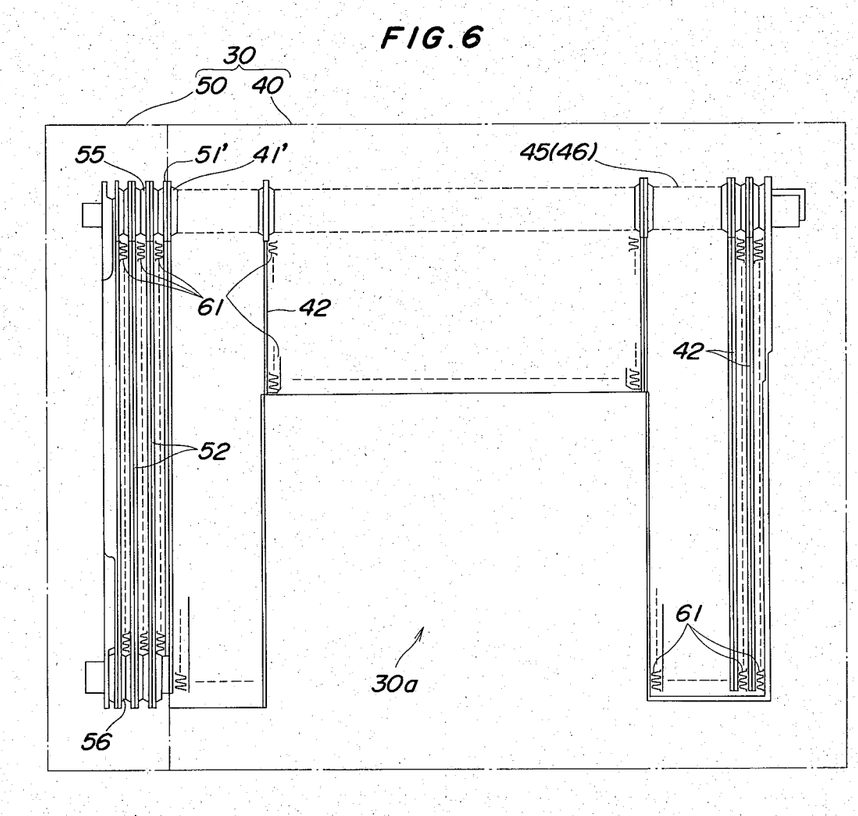
FIG. 6 is a schematic front side view of the radiator unit in FIG. 2.
Figure 7A:
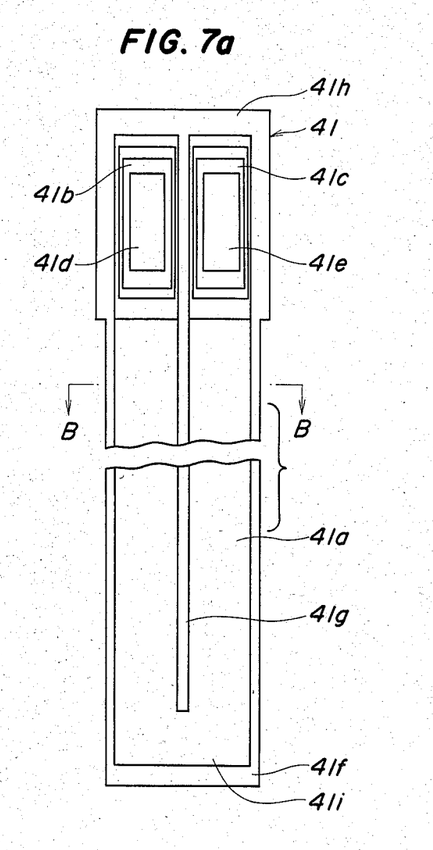
Figure 7B:
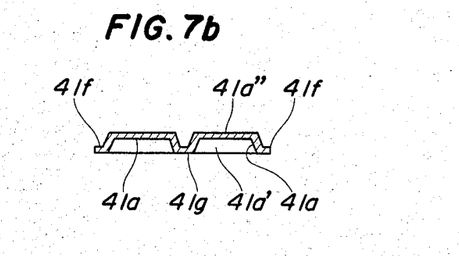
Figure 7C:
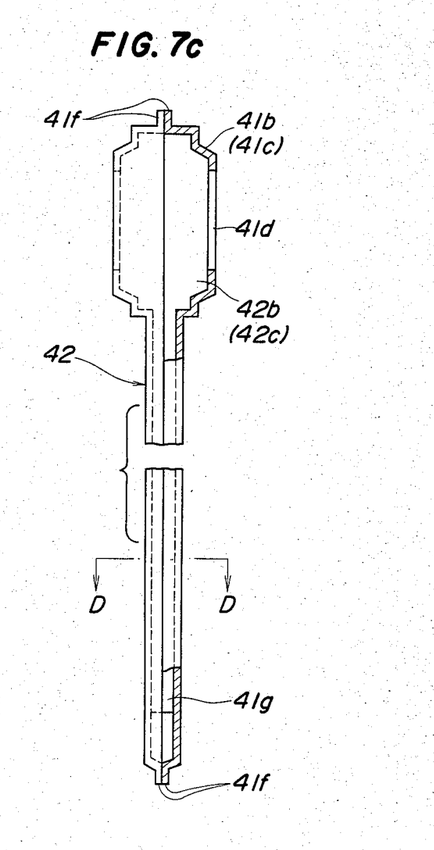
Figure 7D:
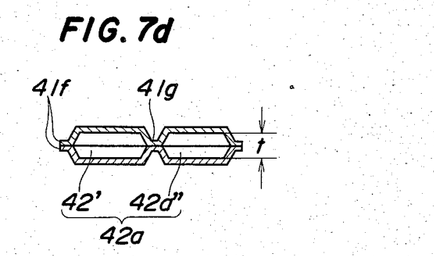

As shown in FIG. 6, the radiator unit 30 is formed in one body and comprised of a water-cooling radiator 40 and an oil cooler 50. More specifically, it comprises a plurality of water-cooling radiator-forming elements 42 each formed of a pair of halves 41 joined together in an abutting manner as shown in FIGS. 7 (a)–7 (d), and a plurality of oil cooler-forming elements 52 each formed of a pair of halves 51 joined together in an abutting manner as shown in FIGS. 8 (a)–8 (d), the elements 42, 52 being juxtaposed to each other.

Each of the halves 41 forming the water-cooling radiator 40 is constructed as shown in FIGS. 7 (a) and 7 (b). It may be formed by stamping an elongate plate of aluminum into a predetermined shape. To be specific, each half 41 has a partition wall 41g extending along its axis from one end 41h and terminating at a point in the vicinity of the other or opposite end 41i, and a passage-forming portion 41a defined along the partition wall 41g over a substantially whole surface of the half 41 and having a substantially U-shaped configuration. The passage-forming portion 41a comprises a substantially U-shaped groove 41a' formed in one side surface of the half 41 for forming a fluid passage, and a swelled surface 41a' formed on the other side surface of the half 41 for abutting and joining with another half 41. The passage-forming portion 41a has both of its opposite end portions located at one end 41h of the half 41 and further swelled to form tank-forming portions 41b and 41c having their end walls formed, respectively, with communication holes 41d and 41e. Also these tank-forming portions 41b, 41c are separated from each other by the partition wall 41g intervening therebetween.

As shown in FIG. 7 (c), two such halves 41 are disposed opposite each other with their passage-forming portions 41a aligned with each other, and joined together in an abutting manner such that flanges 41f formed along their outer peripheral edges and partition walls 41g are joined together, respectively, by means of brazing, to thereby form a hollow radiator-forming element 42 having a substantially U-shaped passage 42a defined therein. As shown in FIG. 7 (d), an intermediate portion of the passage 42a is divided into passages 42a' and 42a" by the partition wall 41g. At one end portion of the radiator-forming element 42, the tank-forming portions 41b, 41c abut with each other to define tank portions 42b and 42c communicating, respectively, with the passages 42a', 42a". With the arrangement that the passages 42a', 42a" communicate with their respective tank portions 42b, 42c separated from each other by the partition walls 41g, fluid flowing into the tank portion 42b further flows downwardly in the passage 42a' and then flows upwardly in the passage 42a" into the tank portion 42c.

Figure 8A:
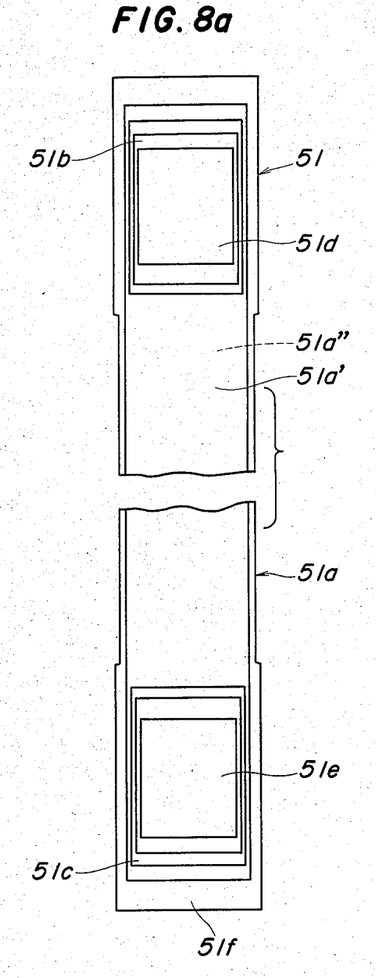
Figure 8B:
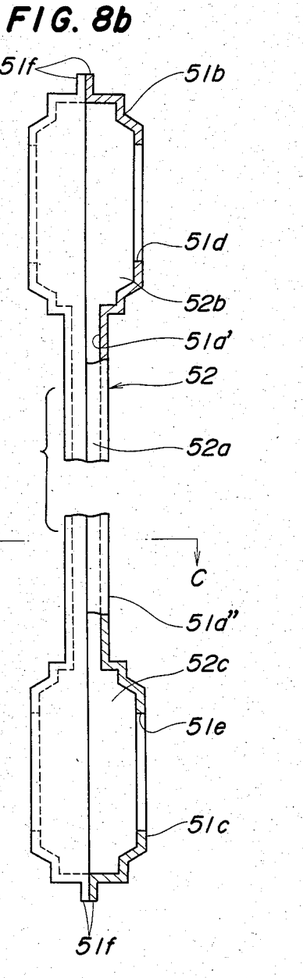
Figure 8C:
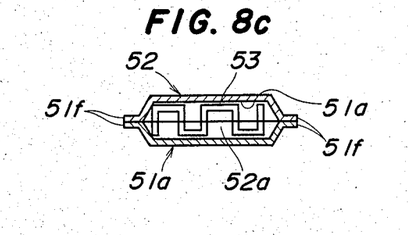

The halves 51 for forming the oil cooler 50 may also be formed by stamping an elongate plate of aluminum into a predetermined shape, like the halves 41 for forming the water-cooling radiator, as shown in FIG. 8 (a). Each of the halves 51 is formed with a straight passage-forming portion 51a which extends along a substantially whole length thereof and comprises a straight groove 51a' formed in one side surface of the half 51, and a swelled surface 51a" formed on the other side surface thereof. End portions of the passage-forming portion 51a corresponding to opposite ends of the half 51 are further swelled to form tank-forming portions 51b and 51c having their end walls formed with respective communication holes 51d and 51e. As shown in FIG. 8 (b), two such halves 51 are disposed opposite each other with their passage-forming portions 51a aligned with each other, and joined together in an abutting manner by means of brazing such that flanges 51f formed along their outer peripheral edges are joined together to thereby form an oil cooler-forming element 52 having a substantially straight passage 52a defined therein. At opposite end portions of the oil cooler-forming element 52, the tank-forming portions 51b, and the tank-forming portions 51c, are also joined together in an abutting manner, respectively, to form tank portions 52b and 52c both communicating with the opposite ends of the passage 52a. Thus, fluid flowing into the tank portion 52b then flows through the passage 52a into the other tank portion 52c. Further, a corrugated fin 53 having a rectangular cross section is disposed within the passage 52a longitudinally along a substantially whole length thereof, so as to increase the substantial area of contact between the oil flowing in the passage 52a and the internal surfaces of the passage 52a, thereby promoting the radiation of oil which is larger in heat capacity than water.

As shown in FIG. 6, a plurality of such water-cooling radiator-forming elements 42 and a plurality of oil cooler-forming elements 52 are arranged in juxtaposition. Interposed between the two groups of elements 42, 52 is a hollow separating element formed by a half 41' substantially identical in configuration with the half 41 except that no communication hole like the communication holes 41d, 41e is formed in the former, and a half 51' substantially identical in configuration with the half 51 except that no communication hole like the communication holes 51d, 51e is formed in the former, both of the halves 41', 51' being joined together in the same abutting manner as the halves 41 or the halves 51, thereby separating the group of radiator-forming elements 42 from the group of oil cooler-froming elements 52. Alternatively of the above separating element having a substantially identical structure with the element 42 or 52, a separating element having a different structure than the latter may be interposed between the above two groups, instead.

To manufacture the radiator unit 30 constructed as above, a predetermined number of radiator-forming elements 42 are placed in juxtaposition such that the communication holes 41d formed in the tank-forming portions 41b are aligned with each other, while the communication holes 41e formed in the tank-forming portions 41c are also aligned with each other. Also, a predetermined number of oil cooler-forming elements 52 are placed in juxtaposition such that the communication holes 51d formed in the tank-forming portions 51b are aligned with each other, while the communication holes 51e formed in the tank-forming portions 51c are aligned with each other. The hollow separating elements 41', 51' are put between the adjacent elements 42, 52. Then, the assembly is subjected to brazing whereby the adjacent tank-forming portions 41b, 41c, 51b and 51c as well as the hollow separating elements 41', 51' are joined together. Thus, the internal spaces in the tank portions 42b of the water-cooling radiator 40 are communicated with each other, thereby cooperatively forming an inlet tank 45 of the radiator 40 as a fluid distributing chamber. In a similar manner, the tank portions 42c joined together cooperate to form an outlet tank 46 of the radiator 40 as a fluid collecting chamber, while the tank portions 52b, 52c joined together cooperate to form an inlet tank 55 of the oil cooler 50 as a fluid distributing chamber, and an outlet tank 56 as a fluid collecting chamber, respectively.

In the illustrated embodiment, those of the radiator-forming elements 42 arranged at a transversely central portion of the radiator unit 30 are formed of relatively short halves 41 so that the radiator unit 30 has a portal or substantially inverted U-shaped configuration, thereby providing a space 30a for the cylinder head 18b in FIG. 3 projected into the central portion of the radiator unit 30. Fins 61 are interposed between adjacent ones of the radiator-forming elements 42 and between adjacent ones of the oil cooler-forming elements 52, which are also joined with end walls of these elements 42, 52 when the assembly is subjected to brazing, thereby increasing the effective heat radiating surface area of the radiator unit 30 for enhancement of the cooling efficiency.

In the above described manner, the radiator unit 30 is completed wherein the radiator 40 and the oil cooler 50 are integrally combined together in one body.

Due to the portal configuration of the radiator unit 30, the time required for cooling water to pass the relatively short passages 42a arranged at the transversely central portion of the radiator unit 30, i.e. the radiating time is different from the time required for cooling water to pass the relatively long passages 42a arranged at the opposite sides of the central portion, which can cause differences in the temperature of the cooling water discharged from the radiator 40. The aforementioned cooling fan 37 facing the central portion of the radiator 40 in FIG. 5 is also intended to eliminate the above disadvantage, which sends air to the same central portion so as to equalize the temperatures of cooling water discharged from the passages 42a at the central portion and the opposite sides thereof.

The radiator unit 30 formed of the radiator 40 and the oil cooler 50 integrally combined together in one body is arranged at the aforementioned location and disposed such that the inlet tank 45 of the radiator 40 is located forward in the advancing direction of the motorcycle 10. The conduits or pipes 29, 31 are connected, respectively, to the inlet tank 45 and outlet tank 46 of the radiator 40, while the conduits or pipes 35, 36 are connected, respectively, to the inlet tank 55 and outlet tank 56 of the oil cooler 50. With this arrangement, cooling water flowing into the inlet tank 45 of the radiator 40 flows downwardly in the passages 42a' located forward in the advancing direction of the motorcycle 10, and then flows upwardly in the passages 42a" located rearward in the same advancing direction, to be discharged into the conduit 31 after temporarily staying in the outlet tank 46.

On the other hand, lubricating oil flowing into the inlet tank 55 of the oil cooler 50 through the conduit 35 flows downwardly in the passages 52a into the outlet tank 56, and is then discharged into the conduit 36. In this manner, hot cooling water and hot lubricating oil are cooled as they travel in their respective passages 42a, 52a, due to the wind blowing the radiator unit during running of the motorcycle.

Although in the foregoing embodiment the tanks 45, 46 of the radiator 40 are formed by tank-forming portions 41b, 41c formed in the halves 41 and the substantially U-shaped passages 42a are formed by the passage-forming portions 41a also formed in the halves 41, this is not limitative according to the invention. Alternatively, a water-inlet tank and a water-outlet tank may be fabricated separately from each other, placed in close juxtaposition, and connected together by means of a generally U-shaped tube. Further, alternatively of the portal configuration, the radiator or the radiator unit may have a rectangular box-shaped configuration. Moreover, the halves 41 and the halves 51 may be just identical in structure with each other to provide a radiator and an oil cooler having the same structure. The radiator or the radiator unit according to the invention is not limited to the vertical flow type as in the illustrated embodiment, but it may be of the horizontal flow type. The connection ports for connecting the tanks 45, 46 with respective conduits 29, 31 need not be located close to each other as in the illustrated embodiment, but they may be suitably spaced from each other so as to facilitate the operation of connecting them to the conduits 29, 31.

Besides, the manner of fabricating the radiator unit 30 is not limited to a specific one. For instance, the radiator-forming elements 42 and the oil cooler-forming elements 52 may be first completed separately from each other, and then the completed elements 42, 52 are joined together. Alternatively, the halves 41, 51 and the separating element halves 41', 51' are placed in juxtaposition as shown in FIG. 6, and then all heated under pressure at the same time to be combined together into the radiator unit 30.

In place of the cooling fan 37 employed in the foregoing embodiment or together therewith, other means may be employed for equalizing the cooling effect throughout the whole radiator 40. For instance, the width t of the radiator-forming elements 42 (FIG. 7 (d)) at the central portion of the radiator unit 30 may be set at a smaller value than that of the radiator-forming elements 42 at the opposite sides thereof so as to make the flow rate of cooling water flowing through the central portion of the radiator unit 30 smaller than that flowing through the opposite sides thereof, thereby enhancing the cooling effect to a higher degree at the central portion than at the opposite sides thereof. Or, the pitch of corrugation of the corrugated fins 61 interposed between passages 42a at the central portion may be set smaller than at the opposite sides thereof so as to increase the cooling effect at the central portion.

The radiator according to the invention can provide excellent results such as follows:

(1) Since the fluid passages are configured in the form of a generally U shape and accordingly the fluid distributing chamber and the fluid collecting chamber are placed side by side and close to each other, connection of connection pipes with the radiator can be effected only at one side of the radiator, facilitating mounting of the radiator into a limited space in a vehicle. Further, the proposed arrangement permits freely setting the lengths of the fluid passages at suitable values, e.g. setting same at much larger values than conventional radiators having the same size as the radiator of the present invention, to obtain a higher heat radiating effect.

(2) The integral one-body formation of a plurality of radiators such as a water-cooling radiator and an oil cooler as a radiator unit enables and facilitates mounting the radiators in a small limited mounting space, minimizes the mounting time, and improves the cooling capacity.

While a preferred embodiment of the invention has been described, such description is for illustrative purposes only, and it is to be understood that changes and variations may be made without departing from the spirit and scope of the following claims.

What is claimed is:

1. A radiator for use in a vehicle having a vehicle body, a water-cooled engine mounted in said vehicle body at a central location thereof, said enging having at least one cylinder projected toward a central portion of said radiator, said radiator being adapted to radiate the heat of hot cooling water from said engine, said vehicle body including a cooling fan disposed to direct air to said central portion of said radiator, said radiator comprising:

a plurality of radiator-forming elements juxtaposed and joined to each other, each element being formed of a pair of half elements joined together in an abutting manner, each half element having:

a partition wall extending along an axis of said half element from a first end portion thereof to a point in the vicinity of a second end portion thereof, a substantially U-shaped groove extending around said partition wall, and a flange formed along an outer peripheral edge of said half element;

each pair of half elements being joined together along said partition walls and said flanges thereof, the partition walls and flanges of the half elements of each elements being aligned with each other so that a substantially U-shaped heat radiating passage is defined within the element, said plurality of radiator-forming elements thus containing a corresponding plurality of U-shaped heat radiating passages juxtaposed to each other, the parts of said radiator-forming elements positionally corresponding to said central portion of said radiator being shorter in length than the other parts of said radiator-forming elements, whereby said radiator assumes a substantially U-shaped configuration adapted to avoid interference of said radiator with said at least one cylinder;

a water distributing chamber disposed at the first ends of said passages and communicating therewith, said water distributing chamber being supplied with cooling water and distributing the cooling water into said passages; and a water collecting chamber disposed at the second ends of said passages and communicating therewith, said water collecting chamber being supplied with cooled water from said passages;

said U-shaped heat radiating passages extending in substantially the same direction as each other, such that said water distributing chamber and said water collecting chamber are closely juxtaposed to each other.

* * * * *